(12) United States Patent
Jain et al.

(10) Patent No.: US 6,577,517 B2
(45) Date of Patent: Jun. 10, 2003

(54) PULSE WITH MODULATION CONTROL CIRCUIT FOR A HIGH FREQUENCY SERIES RESONANT AC/DC CONVERTER

(75) Inventors: Praveen Kumar Jain, Kanata (CA); Haibo Zhang, Kanata (CA)

(73) Assignee: ChipPower. com, Inc., Nepaen (CA)

( * ) Notice: Subject to any disclaimer, the term of this patent is extended or adjusted under 35 U.S.C. 154(b) by 0 days.

(21) Appl. No.: 09/916,583

(22) Filed: Jul. 30, 2001

(65) Prior Publication Data

US 2002/0012260 A1 Jan. 31, 2002

Related U.S. Application Data

(60) Provisional application No. 60/222,001, filed on Jul. 31, 2000.

(51) Int. Cl.[7] .............................................. H02M 5/42
(52) U.S. Cl. .......................................... 363/89; 363/127
(58) Field of Search ................................ 363/89, 21.06, 363/21.14, 53, 127

(56) References Cited

U.S. PATENT DOCUMENTS

| 5,619,403 A | * | 4/1997 | Ishikawa et al. ............. 363/131 |
| 5,726,869 A | * | 3/1998 | Yamashita et al. ........ 363/21.06 |
| 5,822,203 A | * | 10/1998 | Peron .......................... 323/908 |
| 6,222,749 B1 | * | 4/2001 | Peron .......................... 363/125 |
| 6,262,905 B1 | * | 7/2001 | Zhang et al. ................ 363/127 |
| 6,297,970 B2 | * | 10/2001 | Hemena et al. ............. 363/127 |

* cited by examiner

*Primary Examiner*—Shawn Riley
(74) *Attorney, Agent, or Firm*—Max R. Wood; Ogilvy Renault

(57) ABSTRACT

A pulse width modulation control circuit for a high frequency series resonant AC/DC converter suitable for use in computing and network equipment such as personal computers, servers and high-speed routers includes an auxiliary transformer, a zero crossing detector, a delay circuit, a synchronization circuit and an output circuit.

19 Claims, 12 Drawing Sheets

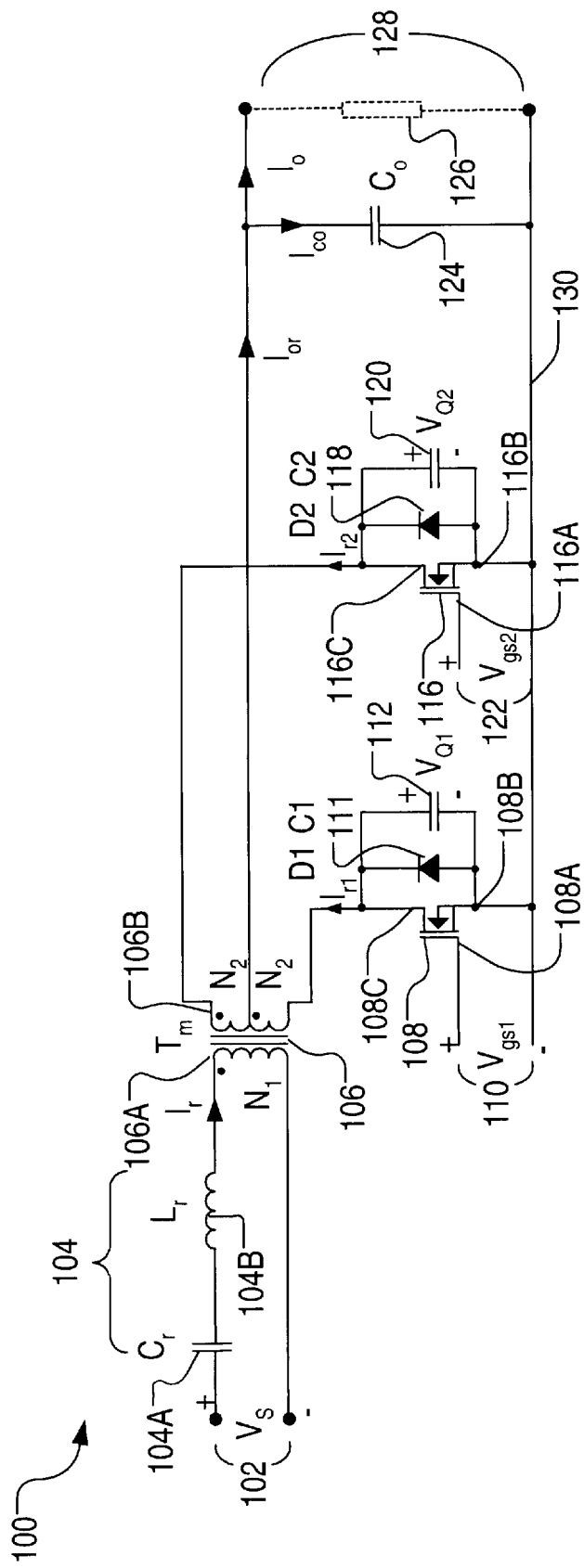
FIG. 1: Resonant synchronous rectifier of a AC to DC converter (Prior Art).

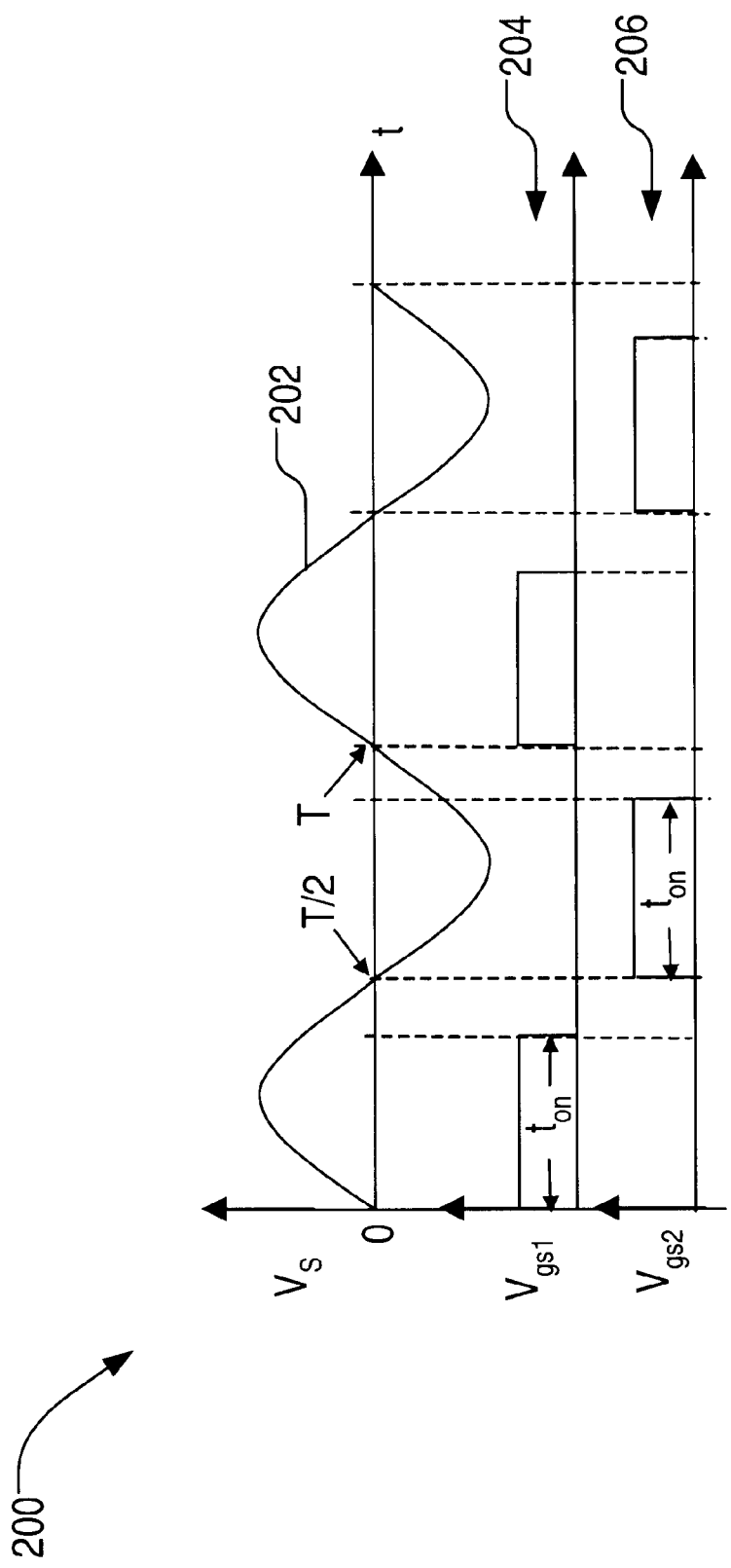
FIG. 2: Signals of the rectifier circuit of FIG.1.

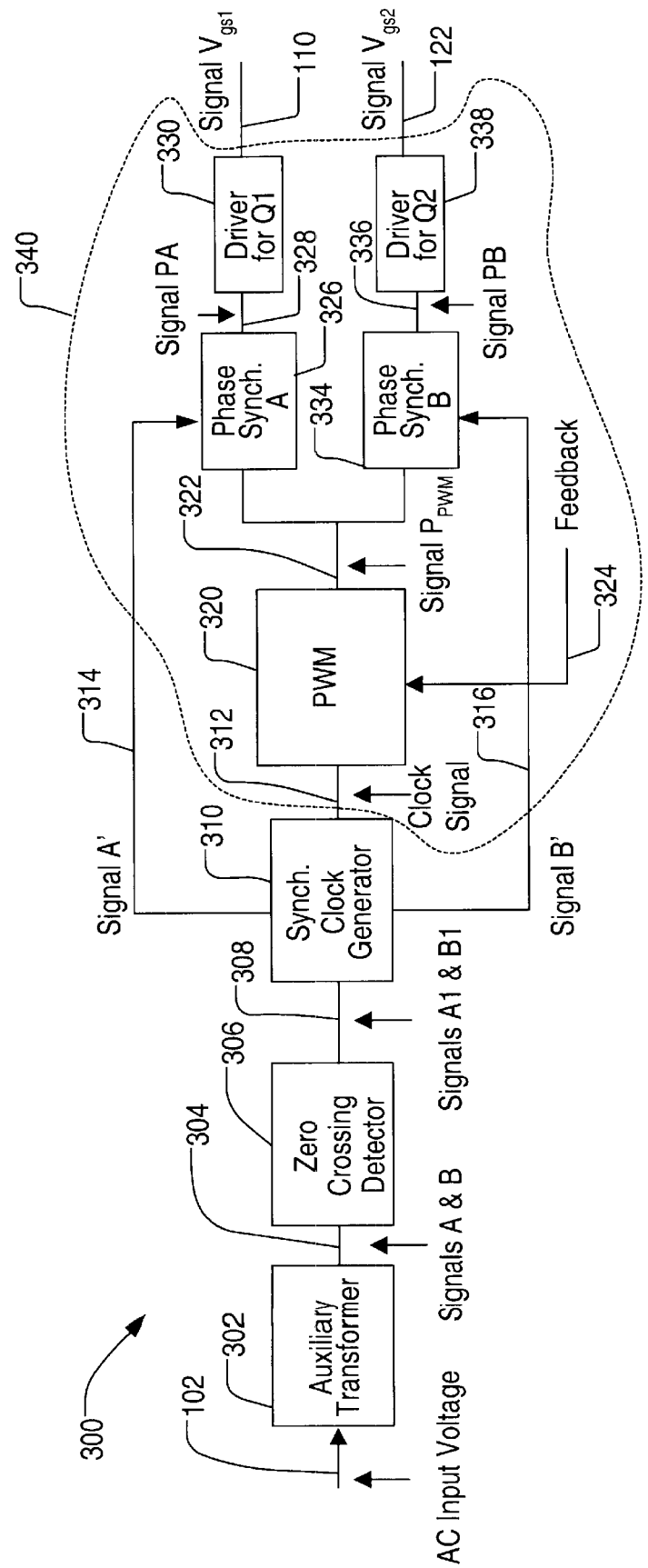
FIG. 3: Control circuit of an AC to DC converter (Prior Art).

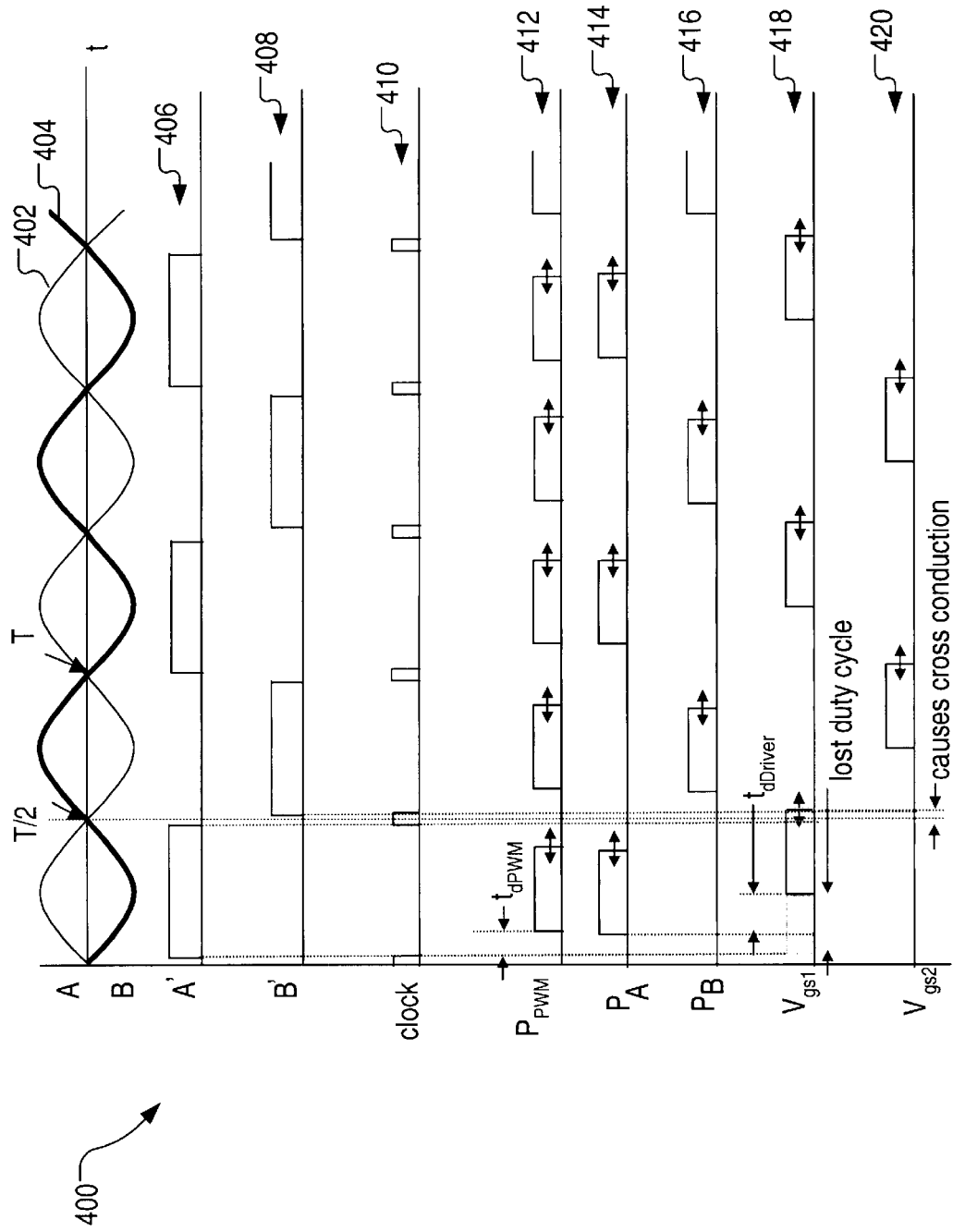
FIG. 4: Signals of the control circuit of FIG. 3.

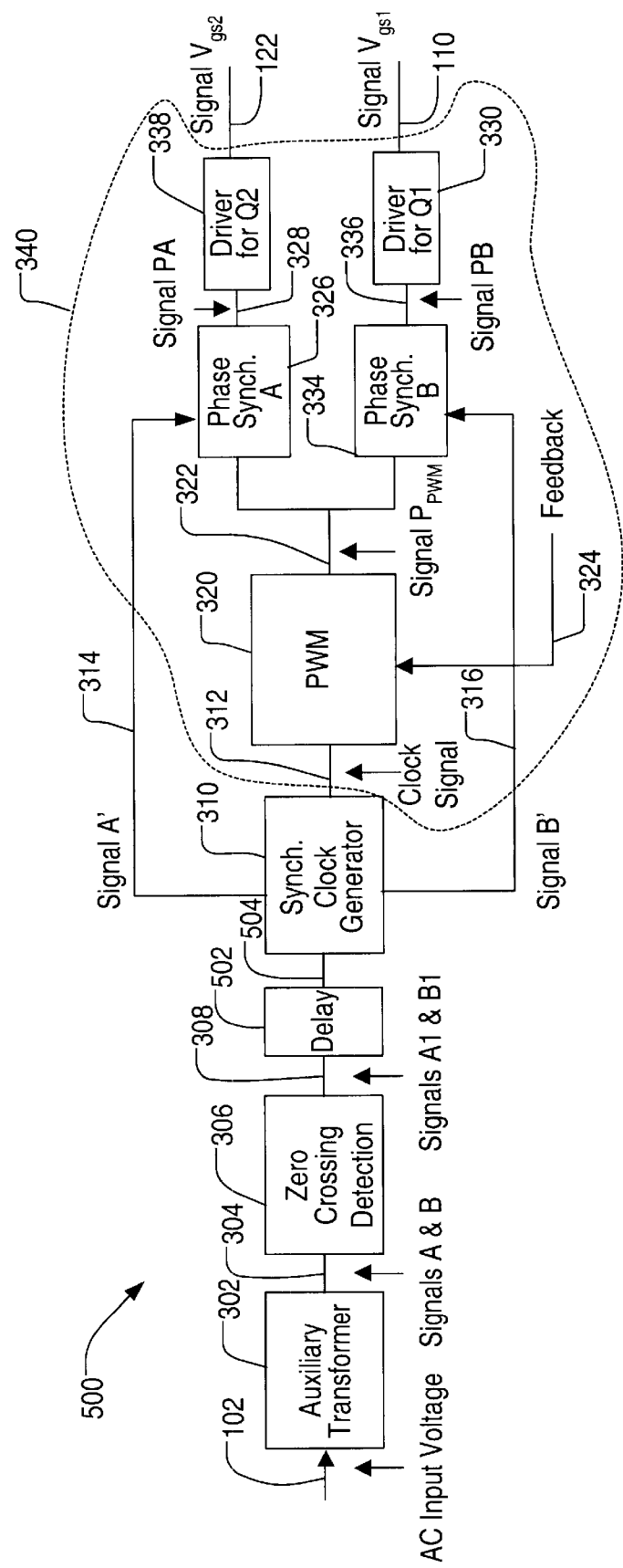
FIG. 5: Control circuit of an AC to DC converter.

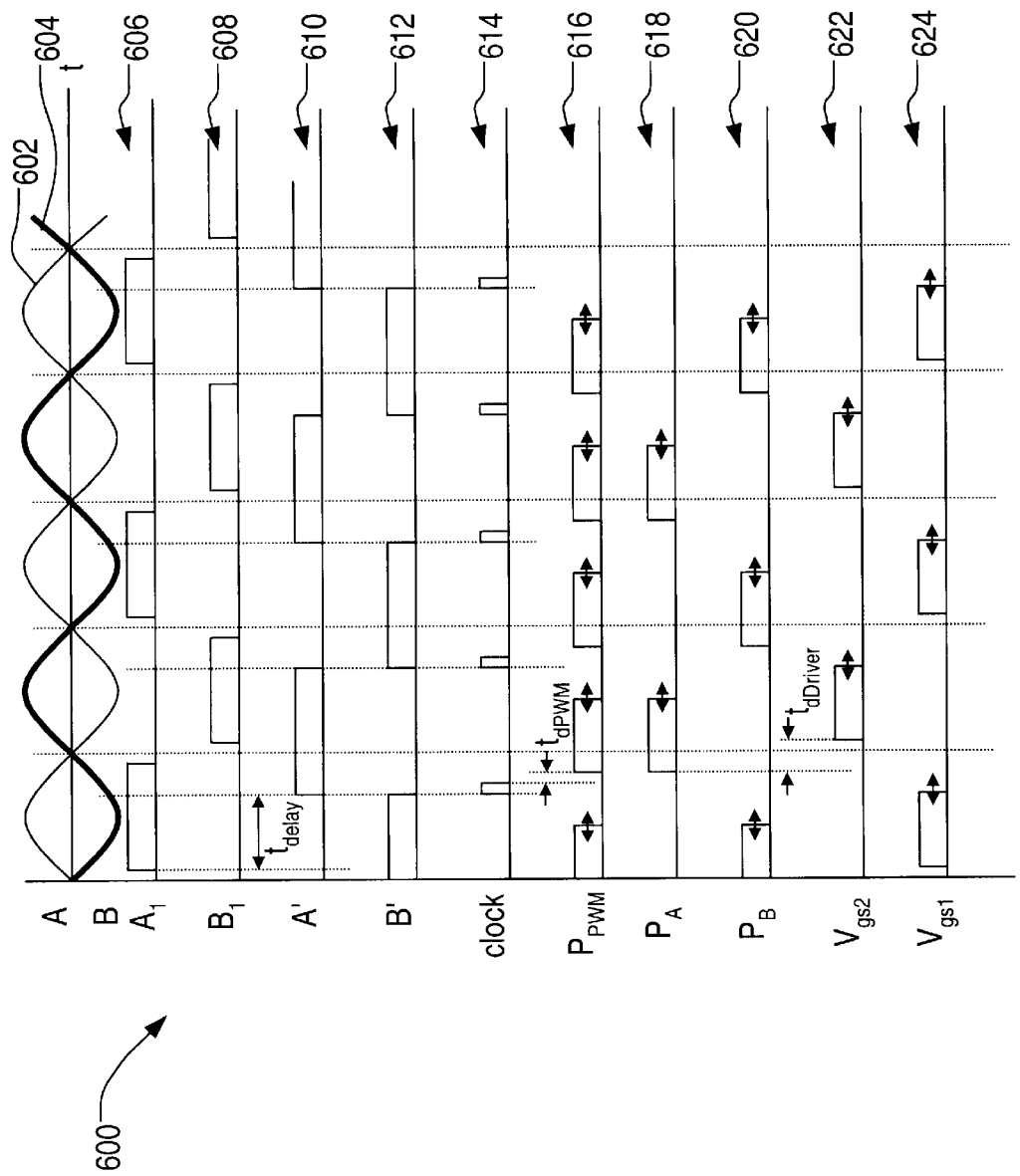
FIG. 6: Signals of the control circuit of FIG. 5.

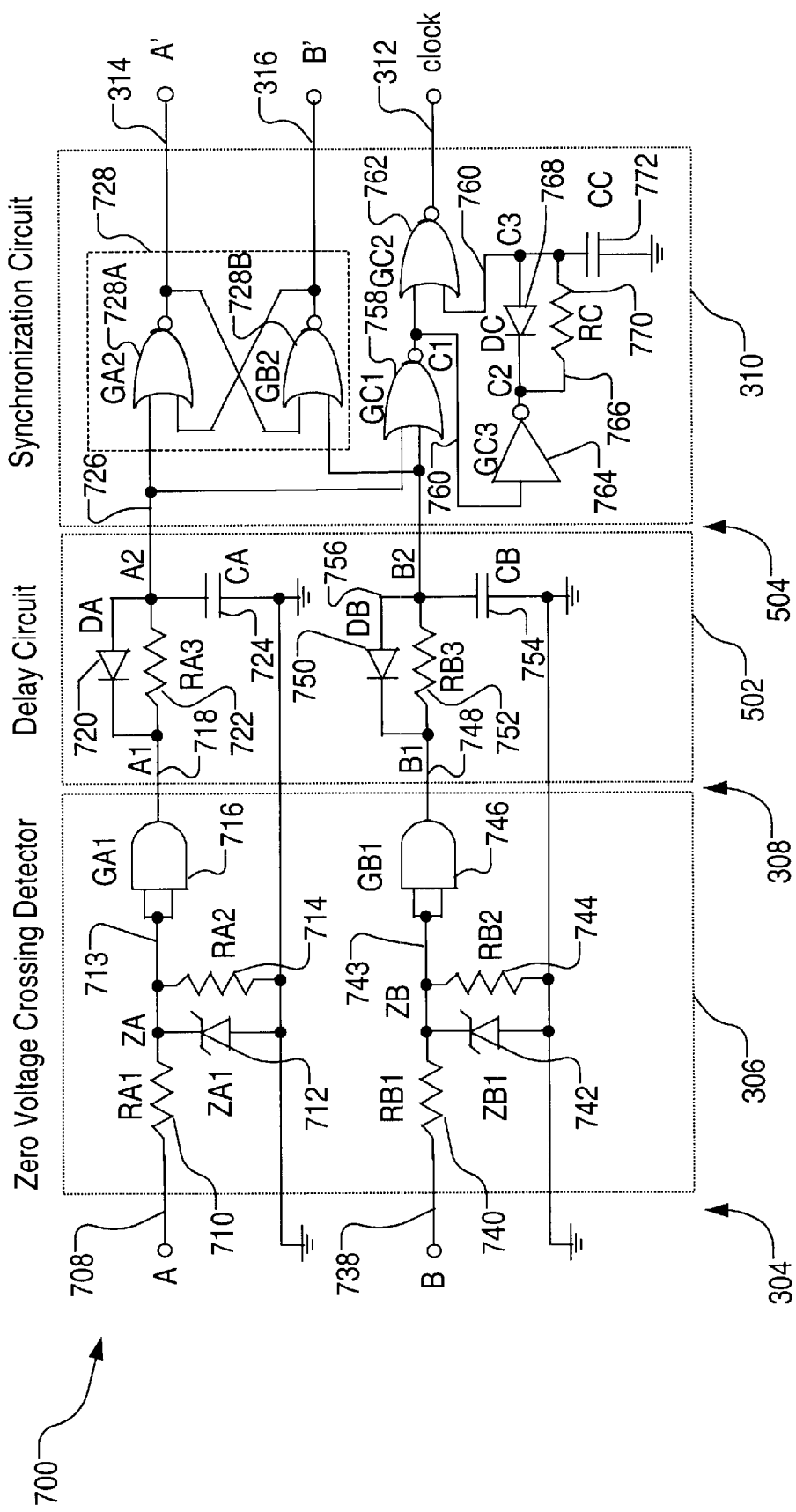
FIG. 7: Zero voltage crossing detector, delay and synchronization circuit.

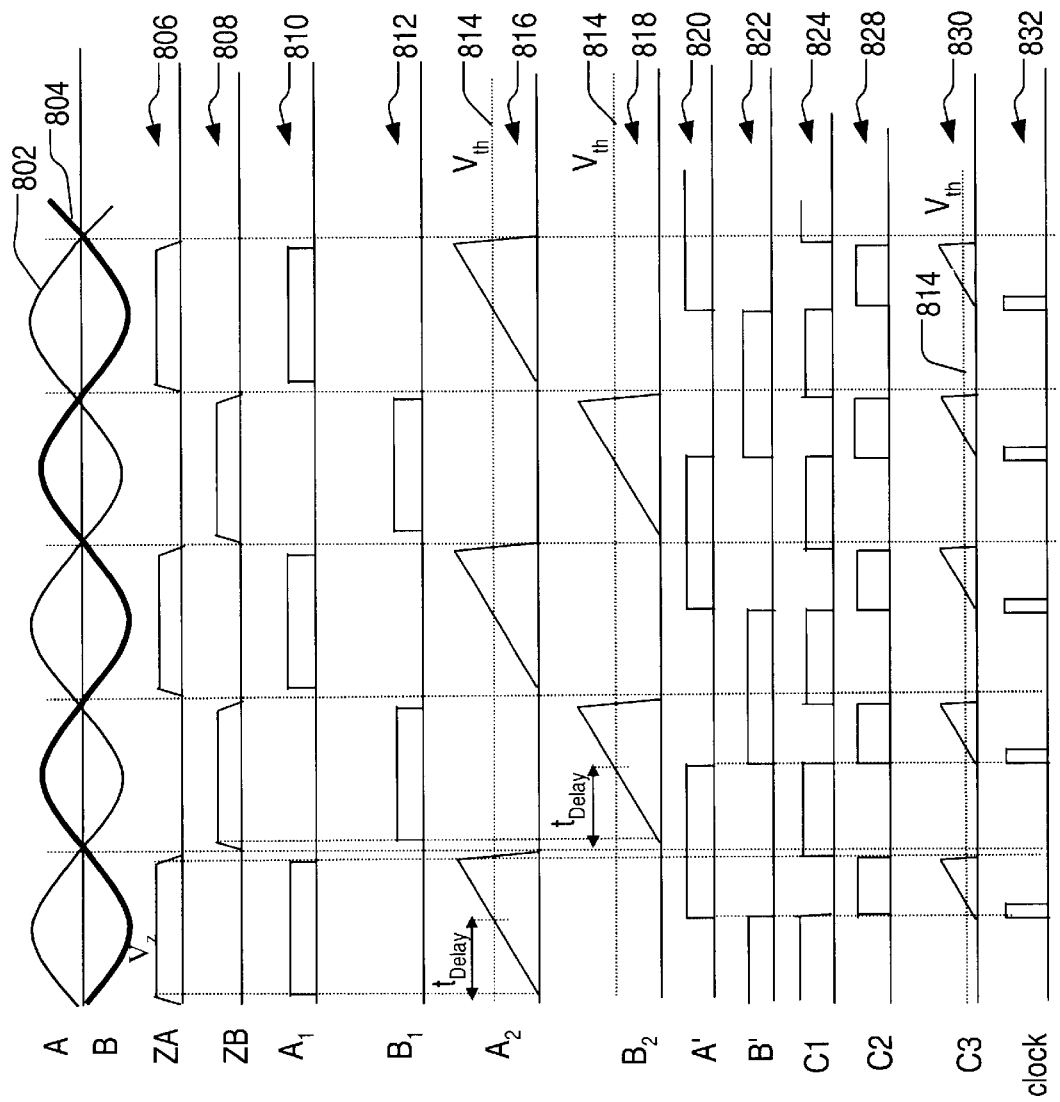
FIG. 8: Signals of the circuits of FIG. 7.

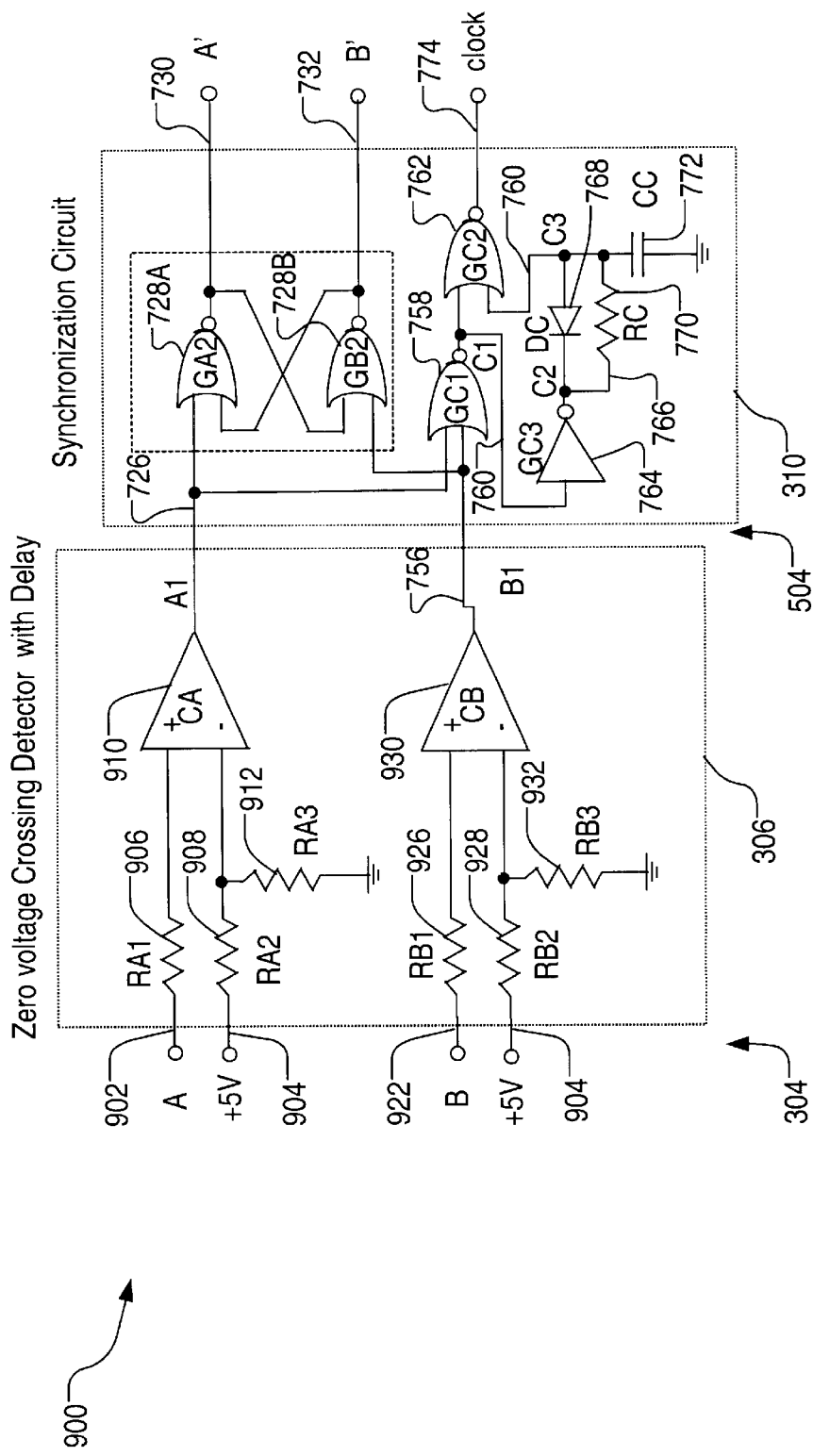
FIG. 9: Zero voltage crossing detector and synchronization circuit with built-in delay (for delay <90°).

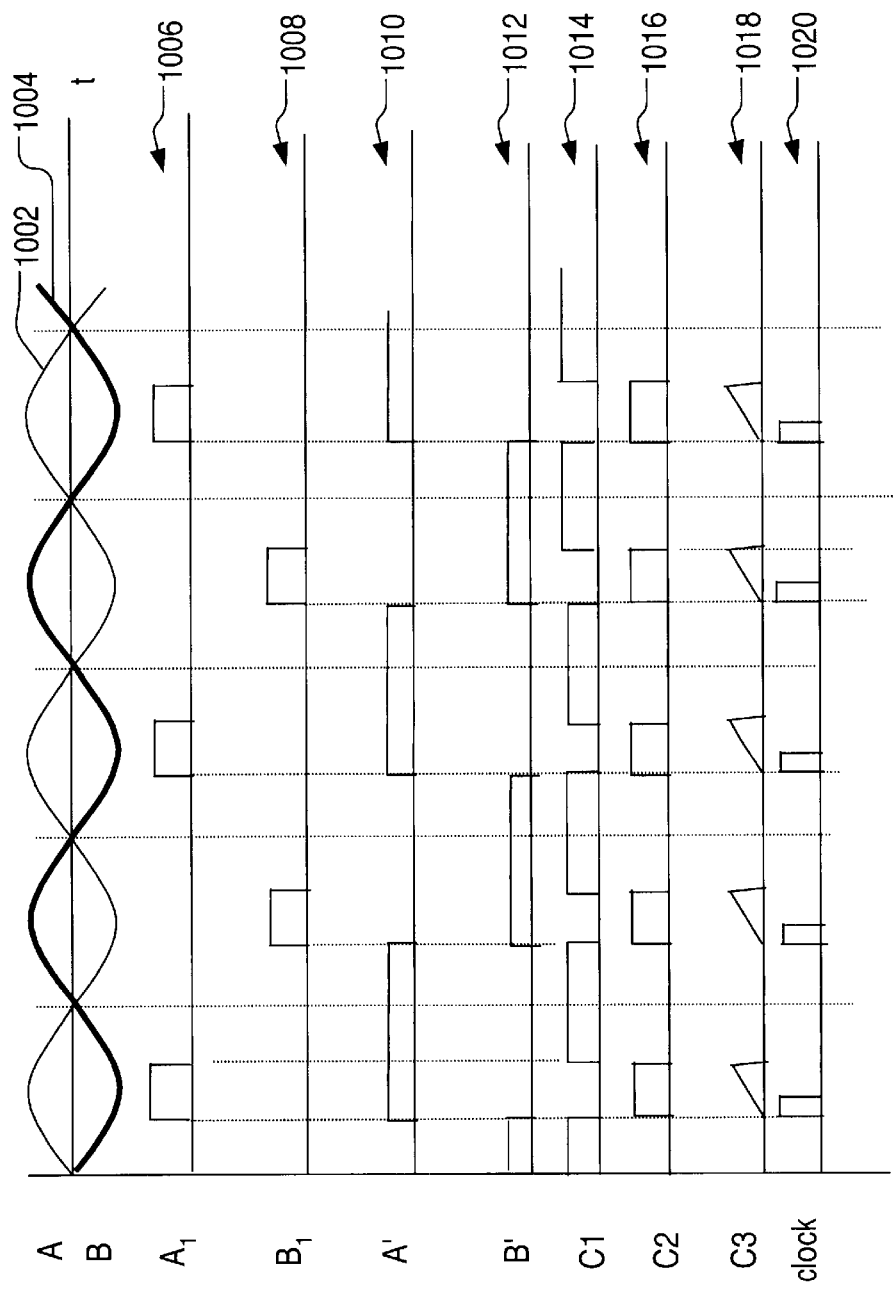
FIG. 10: Signals of the circuits of FIG. 9 (for delay <90°).

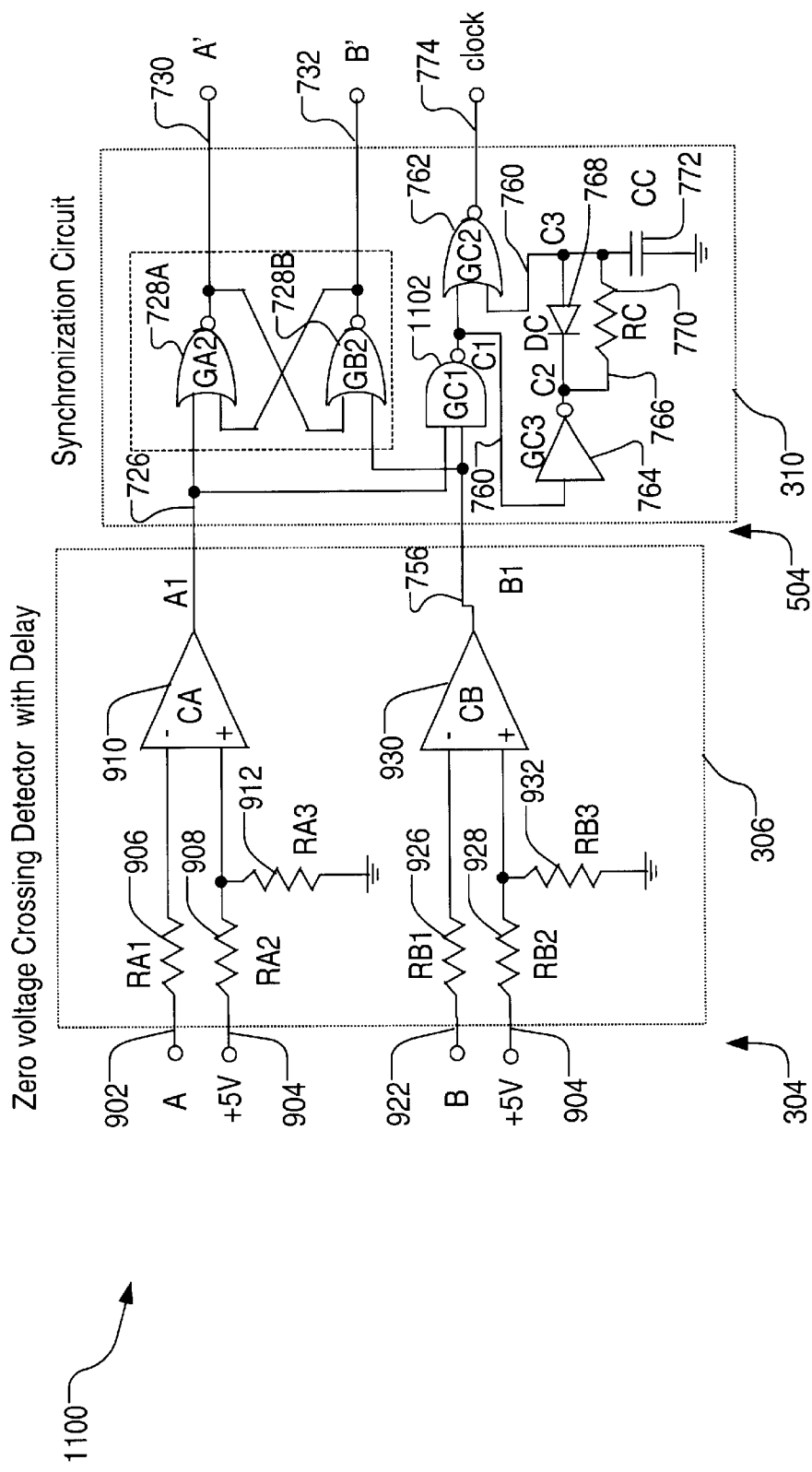
FIG. 11: Zero voltage crossing detector and synchronization circuit with built-in delay (for delay >90°).

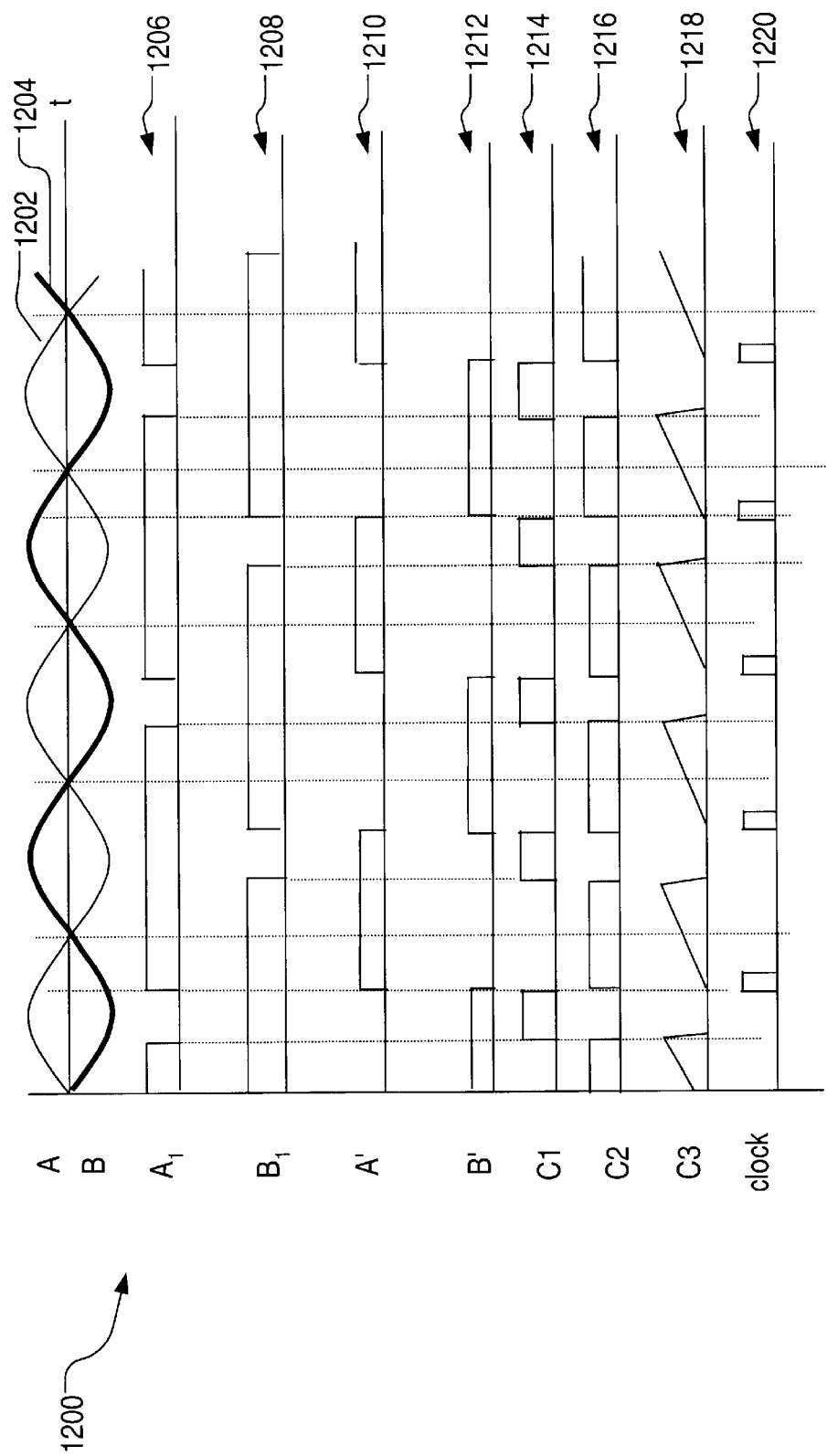
FIG. 12: Signals of the circuits of FIG. 11 (for delay >90°).

PULSE WITH MODULATION CONTROL CIRCUIT FOR A HIGH FREQUENCY SERIES RESONANT AC/DC CONVERTER

CROSS REFERENCE TO RELATED APPLICATIONS

This application claims the benefit of priority from U.S. provisional application No. 60/222,001 filed Jul. 31, 2000.

TECHNICAL FIELD

This invention relates to power supplies for electronic equipment and, in particular, to control circuits for series resonant AC/DC converters for producing controlled DC output voltages with ultra fast transient response from a high frequency AC bus for computing and network equipment such as personal computers, servers, and high speed routers.

BACKGROUND OF THE INVENTION

FIG. 1 shows a circuit diagram of a synchronous rectifier section of 100 of one embodiment of a pulse width modulated high frequency AC to DC converter described in Applicants' co-pending U.S. patent application No. 09/464,950, filed on Feb. 1, 2000. The converter 100 includes a transformer 106 with a primary winding 106A and a center tapped secondary winding 106B. A series resonant circuit 104, that includes a first capacitor 104A and an inductor 104B, is connected in series with the primary winding 106A. An AC input voltage 102 ($V_s$) is applied across the series resonant circuit 104 and primary winding 106A. A first switch, which is preferably a FET 108 (field effect transistor) having a drain 108C, is connected to a first terminal of the secondary winding 106B. A source 108B of the FET 108 is connected to a reference node 130. A first gating signal 110 ($Vgs_1$) is applied across a gate 108A of the FET 108 and the reference node 130. A first diode 111 has an anode connected to the source 108B and a cathode connected to the drain 108C of the FET 108. A first capacitor 112 is connected across the source 108B and drain 108C of the FET 108. Similarly, a second switch, which is preferably also a FET, has a drain 116C connected to a second terminal of the secondary winding 106B. A source 116B of the FET 116 is connected to the reference node 130. A second gating signal 122 ($Vgs_2$) is applied across a gate 116A of the FET 116 and the reference node 130. A second diode 118 has an anode connected to the source 116B and a cathode connected to the drain 116C of the FET 116. A second capacitor 120 is connected across the source 116B and drain 116C of the FET 116. A third capacitor 124 is connected from a center tap terminal of the transformer 106 to the reference node 130. A DC output F voltage 128 across the third capacitor 124 is connected to a load 126 (shown in dashed lines).

FIG. 2 illustrates the required gating signals 200 for controlling the output of the converter 100 of FIG. 1. The AC input voltage 102 (FIG. 1) is a sine wave 202. The first gating signal 110 (FIG. 1) is a first rectangular wave 204 and the second gating signal 122 (FIG. 1) is a second rectangular wave 206. The following is required for successful generation of the gating signals 204,206 of FIG. 2.

1. The gating signals 204,206 should be frequency synchronized with the AC input voltage 102.
2. The gating signals 204,206 should be phase synchronized with the AC input voltage 102.
3. A full pulse width of the gating signals 204,206 should be about 180° in duration.
4. A minimum pulse width of the gating signals 204,206 should be about 0° in duration.
5. The gating signals 204,206 should not cause cross conduction of the FETs 108,116.
6. The gating signals 204,206 should supply high currents to the gates 108A,116A of the FETs 108,116 at a voltage higher than a gate threshold voltage of the FETs 108,116.

There are a number of off-the-shelf Pulse Width Modulation (PWM) integrated circuits (IC) available, which can provide dual output signals that can be synchronized in frequency but cannot be synchronized in phase. One way of implementing a control circuit for the generation of the gate signals using an off-the-shelf PWM, such as UC 2823 from Texas Instruments, is shown in FIG. 3. The control circuit 300 consists of the following functional blocks: an auxiliary transformer 302 for isolating the AC input voltage 102 from control circuits; a zero crossing detector circuit 306 for the high frequency voltage/current; a synchronization circuit 310 for phase and frequency synchronization; a PWM 320 for controlling pulse generation; a first and second phase synchronization circuit 326,334; and a first and second driver circuit 330,338. First and second outputs (signals A and B) of the auxiliary transformer 302 are connected at 304 to a first and second input of the zero crossing detector 306. First and second outputs (signals A1 and B1) of the zero crossing detector 306 are connected at 308 to a first and second input of the synchronization circuit 310. A first output (clock) of the synchronization circuit 310 is connected at 312 to a first input of the PWM 320. A second input of the PWM is connected at 324 to a feedback signal. An output ($P_{PWM}$) of the PWM 320 is connected at 322 to a first input of the first and second phase synchronization circuits 326,334. A second and third output (signals A' and B') of the synchronization circuit 310 are connected at 314 and 316 respectively to second inputs of the first and second phase synchronization circuits 326,334. An output (PA) of the first phase synchronization circuit 326 is connected at 328 to an input of the first driver circuit 330. An output of the first driver circuit 330 provides the first gating signal 110 ($V_{gs1}$). An output (PB) of the second phase synchronization circuit 334 is connected at 336 to an input of the second driver circuit 338. An output of the first driver circuit 338 provides the second gating signal 122 ($V_{gs2}$). For convenience the PWM 320; first and second phase synchronization circuits 326,334; and first and second driver circuits 330,338 will be referred to collectively as an output circuit 340.

Due to a delay in detecting zero voltage crossings, generation of the synchronizing clock pulse, inherent delay in the PWM 320, phase synchronization and internal delay of the drivers 330,338, the gating signals 110,122 generated for FETs 108,116 corresponding to positive and negative half cycles respectively of the AC input voltage 102, are also delayed.

An illustration of the signals 400 generated by the PWM IC shown in FIG. 3 is illustrated in FIG. 4. The auxiliary transformer 302 generates two complementary voltage signals A 402 and B 404 at its output. The zero crossing detector circuit 306 generates signals A' 406 and B' 408. Signals A' 406 and B' 408 correspond to the positive half-cycles of signals A 402 and B 404 respectively. The synchronization clock generator 310 generates a clock signal 410 that is twice the frequency of input signals A 402 and B 404. The clock signal 410 is used to synchronize the PWM 320 at twice the frequency of the AC input voltage 102. Based on the feedback signal 324, PWM 320 generates signal 412 ($P_{PWM}$), which is delayed with respect to the clock signal 410 due to the internal delay $t_{dPWM}$ in the PWM 320. The first and second phase circuits 326,334 generate signals $P_A$ 414 and $P_B$ 416 which are in phase and frequency with the positive half-cycles of signals A 402 and B 404 respectively. Signals $P_A$ 414 and $P_B$ 416 are used to drive the first driver 330 (FIG. 3) and second driver 338 respectively to produce gating signals $V_{gs1}$ 418 and $V_{gs2}$ 420. The internal delays $t_{dDriver}$ of these external drivers further delays the gating signals $V_{gs1}$ 418 and $V_{gs2}$ 420 with respect to the clock signal 410, and consequently with respect to the zero crossings of the input signals A 402 and B 404.

A total typical delay of the circuit is in the order of 125 ns to 150 ns. At frequencies of 1 MHz and higher, this delay is a significant proportion of the switching cycle. This delay in the gating signals 418,420 causes two problems, namely, it reduces the effective duty cycle for the conduction of the FETs 108,116, and it causes cross-conduction between one of the FETs 108,116 and the diode 118,110 connected to the other FETs 116,108. These problems significantly reduce the conversion efficiency and output voltage of the converter.

It is clear from the above discussion that the known circuits for generating gating signals for series resonant AC/DC converters have low conversion efficiency due to cross conduction losses and reduction in effective pulse width.

There therefore exists a need for a new, high-efficiency control circuitry for series resonant AC/DC converters.

SUMMARY OF THE INVENTION

It is therefore an object of the invention to provide appropriate gating signals for the controlled synchronous rectifier switches of series resonant AC/DC and DC/DC converters.

It is a further object of the invention to provide appropriate gating signals for the series resonant AC/DC and DC/DC converters, which reduce cross-conduction of the controlled synchronous switches of the converters.

It is a further object of the invention to provide appropriate gating signals for the series resonant AC/DC and DC/DC converters, which enable high duty cycles for the controlled synchronous switches of the converters.

The invention therefore provides a pulse width modulation control circuit for a high frequency series resonant AC/DC converter suitable for use in computing and network equipment such as personal computers, servers and high-speed routers. The control circuit includes an auxiliary transformer, a zero crossing detector, a delay circuit, a synchronization circuit and an output circuit. The pulse width modulation control circuit provides phase and frequency synchronized gating signals enabling high conversion efficiency, with little or no cross conduction losses and increased effective pulse width.

The invention also provides a method of controlling switches in a converter for converting an AC input signal to a DC signal comprising a step of synchronizing a phase and a frequency of a plurality of gating signals to the AC input signal.

BRIEF DESCRIPTION OF THE DRAWINGS

Further features and advantages of the present invention will become apparent from the following detailed description, taken in combination with the appended drawings, in which:

FIG. 1 is a circuit diagram of a resonant synchronous rectifier of a prior art AC to DC converter;

FIG. 2 is a graph of gating signals generated by the rectifier circuit shown in FIG. 1;

FIG. 3 is a block diagram of a control circuit for a prior art AC to DC converter;

FIG. 4 is a graph of signals generated by the control circuit of FIG. 3;

FIG. 5 is a block diagram of a control circuit of an AC to DC converter in accordance with the present invention;

FIG. 6 is a graph of signals generated by the control circuit of the AC to DC converter of FIG. 5;

FIG. 7 is a circuit diagram of a zero voltage crossing detector, a delay circuit and a synchronization circuit of the control circuit shown in FIG. 5;

FIG. 8 is a graph of signals generated by the circuits shown in FIG. 7;

FIG. 9 is a circuit diagram of a zero voltage crossing detector and a synchronization circuit with a built-in delay (for a delay <90°);

FIG. 10 is a graph of signals generated by the circuits shown in FIG. 9;

FIG. 11 is a circuit diagram of a zero voltage crossing detector and a synchronization circuit with a built-in delay (for a delay >90°);

FIG. 12 is a graph of signals generated by the circuits shown in FIG. 11;

It will be noted that throughout the appended drawings, like features are identified by like reference numerals.

DETAILED DESCRIPTION OF THE PREFERRED EMBODIMENT

The invention provides a pulse width modulation control circuit for a high frequency series resonant AC/DC converter.

FIG. 5 shows a block diagram of the control circuit in accordance with the invention for the generation of the appropriate gating signals, which are suitable for controlling the FETs 108,116 of the circuit shown in FIG. 1.

FIG. 5 is identical to FIG. 3, with the exception that a delay circuit 502 has been inserted between the zero crossing detector 306 and the synchronization circuit 310; and the position of the first and second drivers 330,338 has been reversed. An input of the delay circuit 502 is connected at 308 to the output of the zero crossing detector 306 and an output of the delay circuit 502 is connected at 504 to the input of the synchronization circuit 310. The purpose of the delay circuit 502 is to shift the gating signal 418 generated during the positive cycle for the first FET 108 and the gating signal 420 generated during the negative cycle for the other FET 116. In this way the zero crossing detection is pre-processed and compensation for the effect of the circuit delays is introduced.

FIG. 6 is a schematic diagram of the waveforms generated by the control circuit shown in FIG. 5. The auxiliary transformer 302 (FIG. 5) generates two complementary voltage signals (FIG. 6) A 602 and B 604 at its output. The zero-crossing detector circuit 306 generates signals A1 606 and B1 608. Signals A1 606 and B1 608 correspond to positive half-cycles of signals A 602 and B 604 respectively. The delay circuit 502 (FIG. 5) introduces a time delay $(t_{delay}=T/2-t_{dPMW}-t_{dDriver})$, where T/2 (FIG. 4) is a time between zero-crossings of the AC input signal; $t_{dPWM}$ is the delay through the PWM circuit; and, $t_{dDriver}$ is the delay through the driver circuit. The synchronization circuit 310 generates signals A' 610, B' 612 and a clock signal 614. The rising edge of A' 610 and B' 612 generates the clock signal 614 at twice the frequency of input signals A 602 and B 604.

The clock signal 614 is used to synchronize the PWM 320 at twice the frequency of the AC input voltage 102. Based on the feedback signal 324 (FIG. 5), the PWM 320 generates signal $P_{PWM}$ 616, which is delayed with respect to the clock signal 614 due to the internal delay $t_{dPWM}$ in the PWM 320. First phase and second phase synchronizing circuits 326,334 generate signals $P_A$ 618 and $P_B$ 620 which are in phase and frequency of the positive half-cycles of signals A 602 and B 604 respectively, but are significantly delayed with respect to the positive zero crossings of input signals A 602 and B 604. Signals $P_A$ 618 and $P_B$ 620 are now used to drive the second and first drivers 338,330. The internal delays of these drivers 338,330 further delay the signals $P_A$ 618 and $P_B$ 620 with respect to the clock signal 614, and hence with respect to the zero crossings of the input signals A 602 and B 604.

If the intentional delay is set according to the above criteria, the gating signals $V_{gs2}$ 622 and $V_{gs1}$ 624 output by the drivers 338,330 are in phase with the respective positive half-cycles of input signals A 602 and B 604. Gating signals generated in this way do not cause cross-conduction between the two FETs 108,116, and provide a maximum pulse width of about 180°.

There are a number of circuit configurations that can be used to generate the delay $t_{delay}$ shown in FIG. 6. Three potential circuit configurations are described below.

FIG. 7 shows a circuit diagram 700 for the zero crossing detector 306, the delay circuit 502 and the synchronization circuit 310. The circuit 700 may be implemented as an application specific integrated circuit (ASIC), an integrated circuit (IC) or as discrete components. The zero voltage crossing detector 306 comprises resistors RA1 710, RA2 714, zener diode ZA1 712, and an AND logic gate GA1 716 for detecting zero crossings of input voltage signal A 708. Resistors RB1 740, RB2 744, zener diode ZB1 742 and an AND logic gate GB1 746 detect zero crossings of input voltage signal B 738. The delay circuit 502 includes a resistor RA3 722, a diode DA 720 and a capacitor CA 724 for generating a ramp A2 726. Resistor RB3 752, a diode DB 750 and a capacitor CB 754 for generating a ramp B2 756. The synchronization circuit 310 comprises four NOR logic gates GA2 728A, GB2 728B, GC1 758, GC2 762; one inverter GC3 764; a diode DC 768; a resistor RC 770; and a capacitor CC 772 for generating appropriate pulses for phase synchronization and clock generation.

FIG. 8 illustrates the waveforms generated by the circuit shown in FIG. 7. When positive signal A 802 is applied at the input 708 (FIG. 7) of the zero voltage crossing detector, the voltage 806 at node ZA 713 follows the positive input voltage whenever it is below a zener voltage rating ($V_z$) of diode ZA1 712. It is clamped at $V_z$ whenever the voltage is above the voltage level $V_z$. The voltage 806 at node ZA 713 is clamped at zero during the negative half-cycle. If the zener voltage $V_z$ is equal to a threshold voltage ($V_{th}$) 814 of AND gate GA1 716, a rectangular voltage pulse 810 is output at A1 718. The rectangular voltage pulse 810 generates a ramp voltage 816 node A2 726. Similarly, a ramp voltage signal 818 is produced at node B2 756 corresponding to the positive half-cycle of the input voltage signal B 804 on node 738. If $V_{th}$ is the threshold voltage 814 of NOR logic gates GA2 728A and GB2 728B, the leading output states of both the gates 728A,728B remain unchanged until the ramp voltages A2 816 and B2 818 exceed the threshold voltage $V_{th}$. Therefore, the delay of the signals A2 816 and B2 818 can be adjusted by changing the slope of the ramp voltage signals. The signals A' and B' generated by the synchronization clock generator 310 (FIG. 5) are shown at 820 and 822. The gate signal generated by the NOR gate GC1 is shown at 824, and the gate signals C2,C3 respectively generated by the inverter GC3 and input to the NOR gate GC2 are shown at 828 and 830. The logic gates GC1 758, GC2 762, GC3 764 together with the diode-resistor-capacitor network (DC 768, RC 770, CC 772) generates the clock signal 832, shown in FIG. 8.

FIG. 9 shows a circuit diagram 900 for an alternate embodiment of the zero crossing detector 306 and the synchronization circuit 310 with a built-in delay, when the required delay time is less than one quarter of the period (90°) of the AC input voltage 102. The zero voltage crossing detector 306 comprises resistors RA1 906, RA2 908, RA3 912, and a comparator CA 910 for detecting zero crossings of input voltage signal A 902. Resistors RB1 926, RB2 928, RB3 932 and comparator CB 930 detect zero crossings of input voltage signal B 922. The synchronization circuit 310 comprises four NOR logic gates GA2 728A, GB2 728B, GC1 758, GC2 762; one inverter GC3 764; a diode DC 768; a resistor RC 770; and a capacitor CC 772 for generating appropriate pulses for phase synchronization and clock generation.

FIG. 10 illustrates the waveforms generated by the circuit shown in FIG. 9. When positive signal A 1002 is applied at the input 902 (FIG. 9) of the zero voltage crossing detector, a rectangular voltage pulse 1006 is output at A1 726. Similarly, when positive signal B 1004 is applied at the input 922 of the zero voltage crossing detector, a rectangular voltage pulse 1008 is output at B1 756. Therefore, the delay of the signals A1 1006 and B1 1008 can be adjusted by changing ratio of resistors RA2 908 to RA3 912 and the ratio RB2 928 to RB3 932. The signals A' and B' generated by the synchronization clock generator 310 are shown at 1010 and 1012. The gate signal generated by the NOR gate GC1 is shown at 1014, and the signals C2,C3 respectively generated by the inverter GC3 and input to the NOR gate GC2 are shown at 1016 and 1018. The logic gates GC1 758, GC2 762, GC3 764 together with the diode-resistor-capacitor network (DC 768, RC 770, CC 772) generates the clock signal 1020, shown in FIG. 10.

FIG. 11 shows a circuit diagram 1100 of a further alternate embodiment of the zero crossing detector 306 and the synchronization circuit 310 with a built-in delay, when the required delay time is greater than one quarter of the period (90°) of the AC input voltage 102. The zero voltage crossing detector 306 comprises resistors RA1 906, RA2 908, RA3 912, and a comparator CA 910 for detecting zero crossings of input voltage signal A 902. Resistors RB1 926, RB2 928, RB3 932 and comparator CB 930 detect zero crossings of input voltage signal B 922. The synchronization circuit 310 comprises three NOR logic gates GA2 728A, GB2 728B, GC2 762; one NAND gate 1102, one inverter GC3 764; a diode DC 768; a resistor RC 770; and a capacitor CC 772 for generating appropriate pulses for phase synchronization and clock generation.

FIG. 12 illustrates the waveforms generated by the circuit shown in FIG. 11. When positive signal A 1202 is applied at the input 902 (FIG. 11) of the zero voltage crossing detector, a rectangular voltage pulse 1206 is output at A1 726. Similarly, when positive signal B 1204 is applied at the input 922 of the zero voltage crossing detector, a rectangular voltage pulse 1208 is output at B1 756. Therefore, the delay of the signals A1 1206 and B1 1208 can be adjusted by changing ratio of resistors RA2 908 to RA3 912 and the ratio RB2 928 to RB3 932. The signals A' and B' generated by the synchronization clock generator 310 are shown at 1210 and 1212. The gate signal generated by the NAND gate GC1

1102 is shown at 1214, and the signals C2,C3 respectively generated by the inverter GC3 and input to the NOR gate GC2 are shown at 1216 and 1218. The logic gates GC1 758, GC2 762, GC3 764 together with the diode-resistor-capacitor network (DC 768, RC 770, CC 772) generates the clock signal 1220, shown in FIG. 10.

The invention therefore provides a control circuit for a high frequency series resonant AC/DC converter that has high conversion efficiency, little or no cross conduction losses and increased effective pulse width.

The embodiment(s) of the invention described above are intended to be exemplary only. The scope of the invention is therefore intended to be limited solely by the scope of the appended claims.

We claim:

1. A control circuit for an alternating current (AC) to direct current (DC) converter, comprising a delay circuit for introducing a delay in the generation of gating signals for controlled switches of the converter so that zero crossing detection is pre-processed and compensation for inherent delays in circuits used to generate the gating signals is introduced, the delay circuit causing a leading edge of the gating signals to be in phase and synchronized with zero crossings of the AC input voltage to a terminal of the rectifier switches.

2. A control circuit for an alternating current (AC) to direct current (DC) converter, comprising a delay circuit for delaying first and second converter switch gating signals generated by a zero-voltage crossing detector by a time period:

$$t_{delay} = T/2 - t_{dPWM} - t_{dDriver}$$

wherein $t_{delay}$ is the time period;

T/2 is a time period between zero-crossings of an AC input voltage;

$t_{dPWM}$ is a time delay that occurs when signals are passed through a pulse width modulation circuit of the control circuit; and $t_{dDriver}$ is a time delay that occurs when signals are passed through a driver circuit of the control circuit.

3. A control circuit as claimed in claim 1, wherein the control circuit further comprises:

an auxiliary transformer for receiving AC input voltage and outputting a first plurality of signals;

zero-crossing detector for receiving and modifying the first plurality of signals and outputting a second plurality of signals;

the delay circuit for delaying the second plurality of signals for a predetermined time and outputting a third plurality of signals;

a synchronization circuit for receiving and modifying the third plurality of signals and outputting a fourth plurality of signals; and an output circuit for receiving the fourth plurality of signals and outputting a plurality of signals for driving a plurality of switches of a synchronous rectifier.

4. The control circuit as claimed in claim 3 wherein the plurality of switches are field effect transistors.

5. The control circuit as claimed in claim 1 wherein the delay circuit comprises:

a first diode having a cathode connected to a first input node and an anode connected to a first output node;

a first resistor having a first terminal connected to the input node and a second terminal connected to the first output node;

a first capacitor having a first terminal connected to the first output node and a second terminal connected to a reference node;

second diode having a cathode connected to a second input node and an anode connected to a second output node;

a second resistor having a first terminal connected to the input node and a second terminal connected to the second output node; and a second capacitor having a first terminal connected to the second output node and a second terminal connected to the reference node, whereby a first of the second plurality of signals is received by the first input node; a second of the second plurality of signals is received by the second input node; a first of the third plurality of signals is output on the first output node; and, a second of the third plurality of signals is output on the second output node.

6. The control circuit as claimed in claim 3 wherein the zero-crossing detector comprises:

a first resistor having a first terminal connected to a first input node and a second terminal connected to a first node;

a first diode having a cathode connected to the first node and an anode connected to a reference node;

a second resistor having a first terminal connected to the first node and a second terminal connected to the reference node;

first logic gate having an input connected to the first node and an output connected to a first output node;

a third resistor having a first terminal connected to a second input node and a second terminal connected to a second node;

a second diode having a cathode connected to the second node and an anode connected to the reference node;

a fourth resistor having a first terminal connected to the second node and a second terminal connected to the reference node;

a second logic gate having an input connected to the second node and an output connected to a second output node;

whereby a first of the first plurality of signals is received by the first input node; a second of the first plurality of signals is received by the second input node; a first of the third plurality of signals is output on the first output node; and, a second of the third plurality of signals is output on the second output node.

7. The control circuit as claimed in claim 6 wherein the first and second diodes are zener diodes.

8. The control circuit as claimed in claim 6 wherein the first and second logic gates are AND gates.

9. The control circuit as claimed in claim 3 wherein the synchronization circuit comprises:

a first NOR gate having a first input connected to a first input node, a second input connected to a second output node and an output connected to a first output node;

a second NOR gate having a first input connected to the first output node, a second input connected to a second input node and an output connected to the second output node;

a logic gate having a first input connected to the first input node, a second input connected to the second input node and an output connected to a first node;

a third NOR gate having a first input connected to the first node, a second input connected to a third node and an output connected a third output node;

an inverter having an input connected to the first node and an output connected to a second node;

a diode having a cathode connected to the second node and an anode connected to the third node;

a resistor having a first terminal connected to the second node and a second terminal connected to the third node; and a capacitor having a first terminal connected to the third node and a second terminal connected to a reference node, whereby a first of the third plurality of signals is received by the first input node; a second of the third plurality of signals is received by the second input node; a first of the fourth plurality of signals is output on the first output node; and, a second of the fourth plurality of signals is output on the second output node; and a clock signal is output on the third output node.

10. The control circuit as claimed in claim 9 wherein the Eli logic gate is a NOR gate.

11. The control circuit as claimed in claim 9 wherein the logic gate is a NAND gate.

12. The control circuit as claimed in claim 3 wherein the zero-crossing detector comprises:

a first resistor having a first terminal connected to a first input node and a second terminal connected to a first node;

a second resistor having a first terminal connected to a first reference node and a second terminal connected to a second node;

a third resistor having a first terminal connected to the second node and a second terminal connected to a second reference node;

a first comparator having a positive input connected to the first node, a negative input connected to the second node and an output connected to a first output node;

a fourth resistor having a first terminal connected a second input node and a second terminal connected to a third node;

a fifth resistor having a first terminal connected to the first reference node and a second terminal connected to a fourth node;

a sixth resistor having a first terminal connected to the fourth node and a second terminal connected to the second reference node;

a second comparator having a positive input connected to the third node, a negative input connected to the fourth node and an output connected to a second output node;

whereby a first of the first plurality of signals is received by the first input node; a second of the first plurality of signals is received by the second input node; a first of the second plurality of signals is output on the first output node; and, a second of the second plurality of signals is output on the second output node.

13. The control circuit as claimed in claim 12 wherein the first reference node has a potential of about 5 volts with respect to the second reference node.

14. The control circuit as claimed in claim 3 wherein the zero-crossing detector comprises:

first resistor having a first terminal connected to a first input node and a second terminal connected to a first node;

a second resistor having a first terminal connected to a first reference node and a second terminal connected to a second node;

a third resistor having a first terminal connected to the second node and a second terminal connected to a second reference node;

a first comparator having a negative input connected to the first node, a positive input connected to the second node and an output connected to a first output node;

a fourth resistor having a first terminal connected a second input node and a second terminal connected to a third node;

a fifth resistor having a first terminal connected to the first reference node and a second terminal connected to a fourth node;

a sixth resistor having a first terminal connected to the fourth node and a second terminal connected to the second reference node;

a second comparator having a negative input connected to the third node, a positive input connected to the fourth node and an output connected to a second output node;

whereby a first of the first plurality of signals is received by the first input node; a second of the first plurality of signals is received by the second input node; a first of the second plurality of signals is output on the first output node; and, a second of the second plurality of signals is output on the second output node.

15. The control circuit as claimed in claim 14 wherein the first reference node has a potential of about 5 volts with respect to the second reference node.

16. The control circuit as claimed in claim 1 wherein the control circuit comprises discrete electrical components.

17. The control circuit as claimed in claim 1 wherein the control circuit comprises one of an application specific integrated circuit (ASIC) and an integrated circuit (IC).

18. A control circuit for an alternating current (AL) to direct current (DC) converter, comprising:

a zero-voltage detector circuit for detecting zero crossings of an AC input voltage to the converter; and a delay circuit for delaying a gating signal for a first switch of the converter during a positive cycle of the AC input voltage to the converter, and for delaying a gating signal for a second switch of the converter during a negative cycle of the AC input voltage, so that zero voltage crossing detection is pre-processed and compensation for converter switching circuit delays is introduced during generation of the respective gating signals, to ensure that the first and second switches are switched at zero crossings of the AC input voltage and cross-conduction between the first and second switches is avoided.

19. A method of controlling switches in a converter for converting an AC (alternating current) to a DC (direct current) comprising steps of:

a) detecting zero-crossings of an AC input voltage to the converter; and b) after detecting a zero-crossing of the input AC voltage, generating a gating signal for a first switch of the converter during a positive half-cycle of the input voltage to the converter, and generating a gating signal for a second switch of the converter during a negative half-cycle of the input voltage, so that zero voltage crossing detection is pre-processed and compensation for converter switching circuit delays is introduced during generation of the respective gating signals to ensure that the first and second switches are switched at zero crossings of the AC input voltage and cross-conduction between the first and second switches is avoided.

* * * * *